US005407598A

United States Patent [19]

Olson et al.

[11] Patent Number: 5,407,598

[45] Date of Patent: Apr. 18, 1995

[54] SHAPED SOLID BLEACH WITH ENCAPSULATE SOURCE OF BLEACH

[75] Inventors: Keith E. Olson, Apple Valley; Victor F. Man, Minneapolis, both of Minn.

[73] Assignee: Ecolab Inc., St. Paul, Minn.

[21] Appl. No.: 23,941

[22] Filed: Feb. 26, 1993

[51] Int. Cl.[6] .......................... C01B 7/01; C01B 11/06

[52] U.S. Cl. ................................ 252/186.35; 252/90; 252/99; 252/174.13; 252/186.25; 427/213.31; 428/402.24

[58] Field of Search ...................... 252/186.25, 186.35, 252/90, 99, 174.13; 427/213.31; 428/402.24

[56] References Cited

U.S. PATENT DOCUMENTS

| | | | |
|---|---|---|---|
| 3,154,494 | 10/1964 | Speak et al. | 252/99 X |
| 3,390,092 | 6/1968 | Keast et al. | 252/99 |
| 3,983,254 | 9/1976 | Alterman et al. | 252/95 X |
| 4,136,052 | 1/1979 | Mazzola | 252/99 X |
| 4,219,435 | 8/1980 | Biard et al. | 252/90 |
| 4,338,210 | 7/1982 | Clements et al. | 252/96 |
| 4,460,490 | 7/1984 | Barford et al. | 252/92 |
| 4,532,063 | 7/1985 | Gueldenzopf | 252/90 |
| 4,539,179 | 9/1985 | Meloy | 422/28 |
| 4,569,780 | 2/1986 | Fernholz et al. | 252/90 |
| 4,569,781 | 2/1986 | Fernholz et al. | 252/92 |
| 4,681,914 | 7/1987 | Olson et al. | 252/99 X |
| 4,690,770 | 9/1987 | Jeschke et al. | 252/99 |
| 4,728,453 | 3/1988 | Choy | 252/99 X |
| 4,731,195 | 3/1988 | Olson | 252/174.13 |
| 4,797,221 | 1/1989 | Gueldenzopf | 252/95 |
| 4,830,773 | 5/1989 | Olson | 252/174.13 |
| 4,933,102 | 6/1990 | Olson | 252/90 X |
| 5,133,892 | 7/1992 | Chun et al. | 252/90 |
| 5,213,705 | 5/1993 | Olson | 252/95 |

FOREIGN PATENT DOCUMENTS

| | | | |
|---|---|---|---|
| 2221220 | 1/1990 | United Kingdom | 252/99 |

*Primary Examiner*—Richard D. Lovering
*Attorney, Agent, or Firm*—Merchant, Gould, Smith, Edell, Welter & Schmidt

[57] ABSTRACT

Aqueous bleach solutions can be made by directing a spray of water onto a bulk or shaped solid (brick, tablet, block, etc.) comprising a continuous solid phase of an encapsulated source of an active halogen bleach or a solid comprising a source of an oxidizing active halogen bleach and an encapsulated oxidizing halogen bleach source. Such shaped solids can be used to dispense uniform quantities of an aqueous bleach concentrate to bleaching locus such as a washing machine. The tablets can be made from the encapsulated bleach or from a powder mixture of a particulate, granulated or powdered unencapsulated source of active oxidizing bleach and an encapsulated source of active oxidizing bleach by forming the powder mixture into a desired shape. The presence of the encapsulate in the solid with the powder reduces the tendency of the solid to absorb water which can be wicked through the solid to pass water through the solid into adjacent solids. Substantial proportions of absorbed water can cause the tablets to crack, crumble and to periodically dispense uneven, substantially large and undesirable concentrations of active bleach into a wash or bleach cycle.

28 Claims, 3 Drawing Sheets

SHAPED SOLID BLEACH WITH ENCAPSULATE SOURCE OF BLEACH

FIELD OF THE INVENTION

The invention relates to shaped solid sources of an active bleach that can be used in bleaching or cleaning processes. Active bleach is a common component of many washing or sanitizing processes including washing of kitchenware, tableware, flatware, cookware, etc., laundry, health care appliances, food manufacturing equipment, pharmaceutical manufacturing equipment, etc.

BACKGROUND OF THE INVENTION

A variety of active bleaching compositions are known including active halogen bleaches. Active halogen compositions have been used for many years in a variety of cleaning or sanitizing methods. Such halogen sources can come in the form of gases (gaseous $Cl_2$, $Br_2$, etc.), liquids (aqueous sodium hypochlorite), or solids, calcium hypochlorite, chlorinated sodium tripolyphosphate, chlorinated isocyanuric acid and others. Solids can be dissolved in water to create a bleach concentrate. Such materials can be applied to processing by metering a gas or liquid form of the halogen source into the wash site into an aqueous stream directed to the wash site. Solid halogen sources can be used in a variety of washing processes by adding solids directly to the washing liquor or by metering an aqueous solution of the chlorine source into the wash locus.

Solid sources of halogen bleaches have been used in both aqueous solutions, particulate powders or in solid tablet or brick form. The solid tablet or brick form of the solid active bleach source can pose a problem in control of dispensing. Tablets or bricks of the material are introduced into aqueous dispensers. The dispensers can be calibrated to provide various bleach concentrations, often to provide 1 to 10 grams of halogen per bleach cycle. Within the dispenser the tablet or tablets are fixed mechanically at a fixed distance from an aqueous spray. As the aqueous spray contacts the surface of the solid bleach material the water dissolves a portion of the bleach source creating a liquid concentrate solid which is directed to a wash/bleach cycle. However, water can be absorbed by the tablet and can soak through the entire tablet or brick. The water can pass through this brick and can pass further into adjacent tablets or bricks. The absorbed water can cause the tablet(s) or brick(s) to become cracked, split, crumbled or become "slushy". Such water soaked tablets often become difficult to dispense with adequate control of bleach concentrate in the wash liquor. Parts of the tablet can randomly be released by a disintegrating tablet causing random dispensing of undesirable, harmful, substantially large concentrations of halogen into the washing site. In the instance that the slushy or cracked tablet releases a substantial proportion of its mass into the dispenser, the dispenser can release 100–300 grams or more of chlorine source into the washing locus. Such high concentrations of chlorine can cause metal corrosion to washer or dispenser, fabric damage, color change or other harmful results.

The encapsulation of active sources of halogen bleach with organic and inorganic coatings have been disclosed in Brubaker, U.S. Pat. No. 4,279,764; Brennen, U.S. Pat. No. 3,637,509; Idudson, U.S. Pat. No. 3,650,961; Alterman, U.S. Pat. Nos. 3,983,254 and 3,908,045. Olson, U.S. Pat. No. 4,681,914, teaches the use of encapsulated sources of active halogen in cast solid warewashing detergents. In Olson, the encapsulated halogen source is dispersed in a molten caustic material that solidifies to form a sodium hydroxide based warewashing material.

Accordingly, a substantial need exists in processes using aqueous sources of halogen to provide a solid halogen source that can dispense a uniform proportion of the solid mass of the halogen source without uncontrolled dispensing problems.

BRIEF DISCUSSION OF THE INVENTION

We have found that control over dispensing solid bleach tablets can be obtained by manufacturing a tablet from a source of oxidant halogen bleach including an encapsulated source of oxidant halogen bleach. Alternatively, the tablet or solid can comprise both an unencapsulated powder or granular bleach source and the encapsulated source. The resulting tablets comprise a continuous solid phase comprising an unencapsulated source of oxidant bleach with the encapsulated source of bleach dispersed in the continuous phase. When used together the unencapsulated bleach can be used at a concentration of 20–90 wt % of the tablet and the encapsulated source of chlorine can be used in the tablet at a concentration of about 10 to 80 wt % based on the tablet. We have found that the encapsulated chlorine source aids in tablet formation and substantially reduces the harmful effects of water spray on the solid material. The tablets of the invention can be placed in the dispenser wherein the tablets are contacted with a water spray that creates an aqueous bleach concentrate. The water spray dissolves controlled amounts of the tablet to introduce into the wash liquor a consistent well controlled concentration of a halogen such as chlorine.

For the purpose of this invention the term "brick", "tablet" or "block" connotes a mass of material greater than about 1 gram having a size and shape adapted for introduction into a dispenser to be contacted with a dissolving/dispensing water spray. The water spray, dissolving a controlled portion of the tablet forms an aqueous bleach concentrate that can be directed to a use locus such as a washing machine. The term solid source of oxidant bleach or active halogen bleach relates to a powder, granular, or other pourable solid material that can release active bleach under washing conditions. Aqueous bleach concentrates made using the tablets of the invention can contain up to about 10,000 parts per million of active oxidant bleach per million parts of aqueous solution. Such concentrate can be directed into a wash liquor in a wash machine and can be used at a concentration of a preferred source of active chlorine in contact with a soiled article in amounts of about 5 to 500 parts of active chlorine per million parts of wash liquor. The tablets of the invention are preferably made by blending a powdered source of chlorine with an encapsulate source of chlorine in a particulate form. The blended powder is then preferably compressed into tablets using available technology.

In our experimentation leading to the invention a number of materials were used to bind powdered or granular sodium dichloroisocyanurate into useful tablets. Additives such as Carbowax, fatty acids, inorganic materials, etc. were used as binders in common compression molded tableting operations. Overall, we have found that inorganic materials aid in tableting but failed to reduce the tendency of the chlorine source to absorb water leading to crumbling and uneven dispensing. We have found that some organic materials form adequate tablets with useful dispensing properties but are unstable in the presence of the highly active chlorine source. At high temperatures the material can discolor or smolder at concentrations useful in tableting. Further, we have found other additive materials that form useful tablets but introduce substantial hydrophobicity into the tablets leading to a failure to dispense adequate proportions of oxidizing bleach. We have found that the encapsulated oxidizing bleach source provides a number of advantages. First, the encapsulated bleach source acts as a binder material permitting the formation of mechanically stable shaped solids of halogen releasing material. Further, the coating of the encapsulated oxidizing bleach provides control over the hydrophobicity of the tablet leading to the dispensing of controlled amounts of the active bleach. The encapsulated chlorine source, while acting as a binder and dispensing control agent, does not substantially dilute the concentration of chlorine in the tablet. Lastly, the presence of the encapsulated source provides a stable tablet which can dispense a controlled even proportion of the solid material into the aqueous concentrate which is then directed to a cleaning locus for cleaning action on a variety of articles. The bleach source can be used to clean dishware, tableware, kitchenware, laundry, sheets, towels, food production equipment, pharmaceutical production equipment and any other related surface that requires bleaching, sanitizing or other action of oxidizing bleaches.

DETAILED DESCRIPTION OF THE INVENTION

Active Oxidant Bleach

Figure 1:
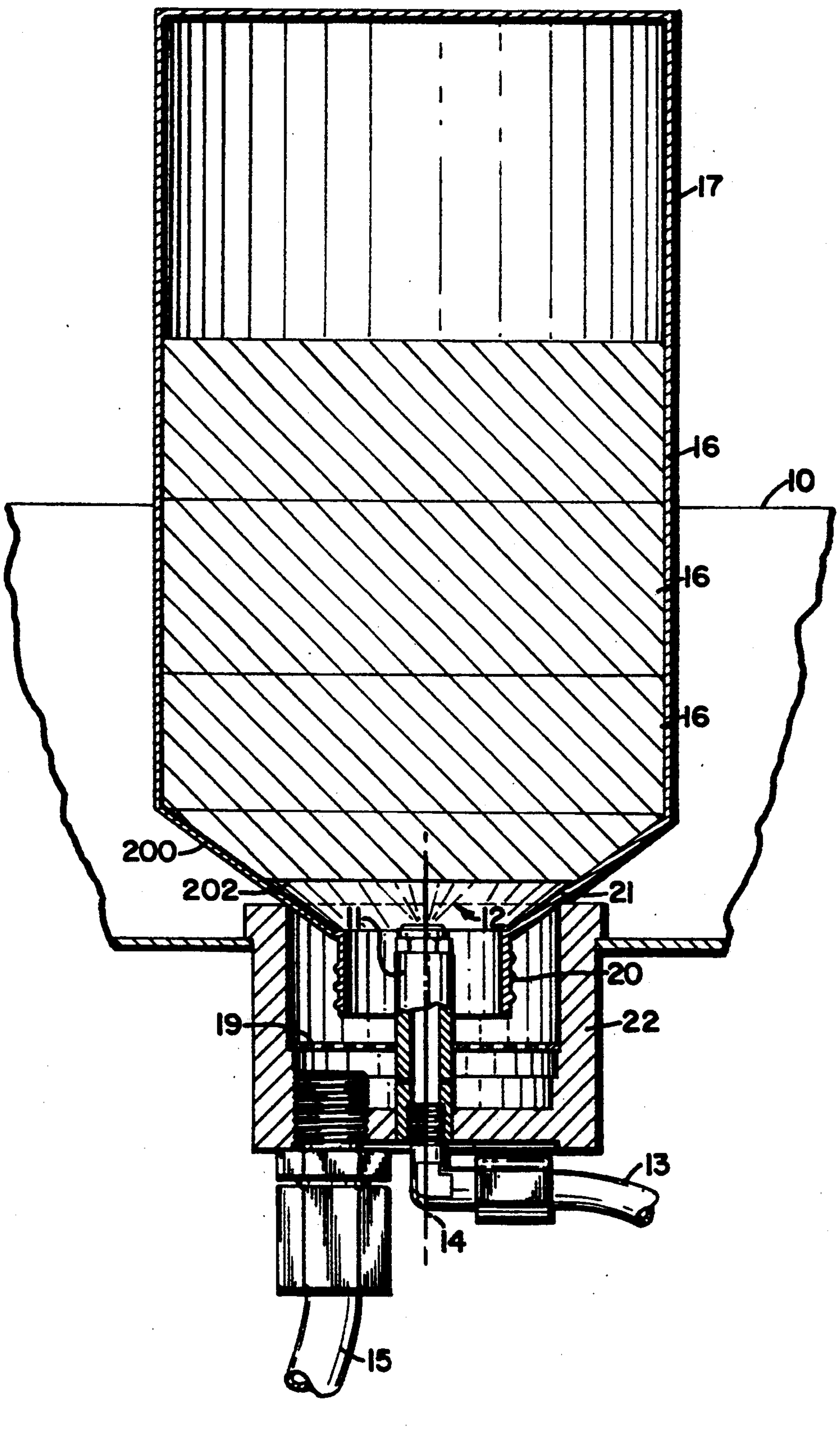
FIG. 1 is an illustration of a water spray type dispenser enclosing a container with three of the preferred halogen containing circular tablets of the invention.

The bricks, tablets or blocks of the invention can comprise a source of active oxidant bleach such as active halogen or active oxygen and an encapsulated source of active halogen oxidant bleach.

The source of active halogen used in the continuous phase of the solid tablet of the invention and used in the core of the encapsulated source of halogen can comprise a halogen releasing substance suitable to liberate active halogen species such as free elemental halogen (Cl, Br, $Cl_2$, $Br_2$) or —$OCl^-$ or —$OBr^-$, under conditions normally used in detergent bleaching cleaning processes of a variety of cleaning targets. Preferably the halogen releasing compound releases chlorine or bromine species. The most preferred halogen species is chlorine. Chlorine releasing compounds include potassium dichloroisocyanurate, sodium dichloroisocyanurate, chlorinated trisodium phosphate, calcium hypochlorite, lithium hypochlorite, monochloramine, dichloramine, [(monotrichloro)-tetra(monopotassium dichloro)]pentaisocyanurate, 1,3-dichloro-5,5-dimethylidantonone, paratoluene sulfodichloro-amide, trichloromelamine, N-chloramine, N-chlorosuccinimide, N,N'-dichloroazodicarbonamide, N-chloroacetyl-urea, N,N-dichlorbiurile, chlorinated dicyandiamide, trichlorocyanuric acid, dichloroglycourea, etc. Chlorinated isocyanurate materials including dichloroisocyanurate dihydrate, sodium dichloroisocyanurate, potassium dichloroisocyanurate, etc. are preferred chlorine sources suitable for the continuous solid phase and for the core substance of the encapsulated material. Chlorinated isocyanurates are commercially available from Monsanto or Olin and other vendors.

Encapsulate

We have found that combining a solid bleach source with an encapsulated bleach source in a brick, block or tablet provides substantially controllable dispensing properties in the solid when contacted with water and provides binder properties. Encapsulated chlorine sources of the invention comprise a chlorine source core and at least one encapsulating layer. The encapsulating layer can comprise an inorganic material or an organic material. Further, the core chlorine source can be covered with two, three or more useful layers. Preferably we have found a two layer coating scheme wherein the core is coated with a inner inorganic layer and an outer organic layer comprising a material (detergent, sequestrant, builder, antiredeposition agent, etc.) useful in washing liquors. For the purposes of this application the term "encapsulating agent", as used herein encompasses solid soluble inorganic compounds used as inert fillers in detergent compositions and soluble inorganic builders used in detergent compositions which contribute to the detergency of the composition and which do not substantially react with a halogen bleach. The external organic phase of the encapsulate can comprise a variety of encapsulating materials that can be selected from small molecule, monomeric or polymeric sources.

Organic Coatings

Small molecule organic compositions that can be used for the external encapsulate layer comprise a large variety of water soluble organic compounds.

A preferred class of small molecule organic encapsulate materials comprise synthetic surfactant compounds. The synthetic surfactant coating must remain sufficiently solid at storage or use temperatures encountered by the encapsulate during storage of the product, for example, temperatures of about 15° to 50° C. and also remain stable at temperatures likely to be encountered during processing of the product. Synthetic surfactants useful in making the encapsulates of the invention include anionic, cationic, nonionic and amphoteric surfactant compositions. Examples of anionic surfactants useful in the encapsulate compositions of the invention are the higher alkyl mononuclear aromatic alkali metal sulfonates such as alkyl benzene sulfonate, xylene sulfonate, alpha olefin sulfonates, primary and secondary alkyl sulfates and others. Alkali metal salts of fatty acids commonly classified as soaps can be used in the definition of an ionic detergent. Examples of such operable soaps include sodium and potassium salts of acyclic monocarboxylic acids having 8 to 12 carbon atoms. A particularly suitable synthetic surfactant for use in a coating composition is sodium alkyl sulfonate having from about 6 to 12 carbon atoms, preferably sodium octyl sulfonate.

Typical nonionic surfactants are commonly materials that contain polymer ethylene oxide, propylene oxide or heteric or block copolymers thereof. Such materials can be made as the condensation products of alkyl phenols having 5–15 carbon atoms any alkyl group, the condensation product with a long chain fatty alcohol or acid, etc. These nonionic surfactants are well known in the art and are available to the skilled artisan. Cationic and amphoteric surfactants are known but are not preferred for these applications. Suitable builders that can be used in the compositions of the invention include weakly acid neutral or alkaline reacting inorganic or organic compounds especially inorganic or organic complex forming substances such as the bicarbonates, carbonates, borates, and silicates of alkali metal or alkali earth metal salts. The alkali metal ortho, meta, pyro and tripolyphosphates are a useful filler/sequestrant material. Another class of suitable builders are the insoluble sodium alumina silicates. Generally, the shaped solid sources of active bleaching agent of the invention can also contain other elements which impart varying degrees of physical or chemical characteristics. Constituents such as optical binders, deodorizers, antiredeposition agents, dyes, perfumes, dispersing agents, etc. can be added to the shaped solids for known properties.

Soluble Inorganic Coating Agent

Inorganic materials suitable for the coating of the encapsulate of the invention include alkali such as sodium bicarbonate, sodium sesquicarbonate, sodium borate, potassium bicarbonate, potassium sesquicarbonate, potassium borate, phosphates such as diammonium phosphate, monocalcium phosphate, monohydrate, tricalcium phosphate, calcium pyrophosphate, iron pyrophosphate, magnesium phosphate, monopotassium orthophosphate , potassium pyrophosphate, disodium orthophosphate dihydrate, trisodium orthophosphate decahydrate, tetrasodium pyrophosphate, sodium tripolyphosphate, a sodium polyphosphate compound, sodium hexametaphosphate, potassium tripolyphosphate, a potassium polyphosphate compound, neutral or soluble salts such as sodium sulfate, sodium chloride silicates, inorganic sequestering agents and antiredeposition agents and hydrates thereof. Suitable builder compounds that can be used in the coatings of the encapsulate include tetrasodium or tetrapotassium pyrophosphate, pentasodium or pentapotassium tripolyphosphate, sodium or potassium silicates, hydrated or anhydrous borax, sodium or potassium sesquicarbonate, phytates, polyphosphonates and others.

The manufacture of the encapsulated source of oxidizing bleach can be carried out by first providing an initial inorganic protective passivation coating of the core material which can be conveniently applied using fluidized coating apparatus. In making encapsulated materials, the particulates are introduced into the fluidizing chamber of a fluidized bed. The bed of particles to be coated is then suspended with the fluidizing atmosphere. A nozzle is typically introduced into or nearby the fluidized bed through which liquid droplets of coating material are discharged in a diverging pattern coextensive with the upper surface of the bed. Coating solution is applied to the bed at a temperature required for rapid drying of the coating solution on the core particles. Solvent vapors can be removed from the fluidized bed with a blower. Once the particles are fully covered with an initial coating, subsequent coatings can be formed in a similar fashion using known technology. The encapsulated oxidizer of the present invention can contain 20 to 90 wt % of the active oxidizing bleach core and 10 to 80 wt % of a coating. In the instance that dual coating are used, the encapsulated material can comprise about 20 to 90 wt % of an oxidizing bleach core, about 0.5 to 50 wt % of a first passivating inorganic coating agent and about 5 to 70 wt % of a second synthetic surfactant second coating. More particularly, the single coated oxidizing bleach comprises 30 to 80 wt % of bleach core and about 20 to 70 wt % synthetic surfactant coating, most particularly about 40 to 55 wt % of oxidizing bleach core and 45 to 60 wt % of the first coating. A most preferred embodiment of the double coated oxidizing bleach encapsulate comprises about 30 to 80 wt % of the bleach core, about 5 to 50 wt % of a first inorganic coating agent and about 5 to 50 wt % of a second synthetic surfactant coating. Other materials may be present in the coating layer such as conventional additives used in bleaching or cleaning laundry, dishware, etc. Typical examples include well known soil suspending agents, corrosion inhibitors, dyes, perfumes, fillers, optical brighteners, enzymes, germicides, antitarnishing agents, and the like.

Manufacturing Process

The shaped solids of the invention can be made using a variety of known shaping technologies. The shaped solids can be made by compression processes, the use of molten binding agents, and others well known to the skilled artisan. The process for manufacturing the shaped solid compositions of the present invention generally comprises two steps. First, the constituent powders used in the shaped solids are introduced into a mixing apparatus to form a homogeneous powder blend. Commonly available mixing apparatus such as ribbon blenders can be used. The homogeneous powder blend is then placed in a commonly available press which can compress the powders into a shaped tablet, brick or block. Generally the preblended powder or granulate is placed in a hopper with feeder systems and metered into a tabletizer. The tablet size can vary from about 1 gram to 100 grams and greater. Preferably, the tablet comprises from 500–2000 grams and can take any convenient shape. One shape readily made by most compression tabletizers is a disc or cylinder. The cylinder diameter can range from approximately ¼ inch to 5 inches or greater having a thickness of about ¼ to about 5 inches, preferably about 0.5 inch to 3 inches.

DETAILED DISCUSSION OF THE FIGURES

FIG. 1 is a cross section of a portion of the dispenser used for introducing the active halogen bleach concentrate made using the shaped solids of the invention. In FIG. 1 the dispenser housing 10, a portion of an overall housing for a dispenser that can be adapted for dispensing one, two or more encapsulated solid materials can be configured for dispensing the shaped solids of the invention. An example of the dispenser shown in the Figure is the Solid System III™ dispenser. Such a dispenser is used in laundry dispensing. In FIG. 1 a spray nozzle 11 is shown with a cone-shaped spray 12 directed from the nozzle 11 onto the surface of the shaped solids 16 contained within a plastic capsule 17 which is then attached to the dispenser with a threaded connector 20 and shoulders 21 that cooperate with the housing of the nozzle 22. In the operation of the dispenser, fresh water is introduced into the dispenser through conduit 13, the water is sprayed through the nozzle 11 onto the shaped solid 16 creating a concentrate. The concentrate then passes down through the opening of the capsule 20 through the screen 19 to the outlet 15. Any large portions of the shaped solid that is released can be trapped by the screen 19.

Figure 2:
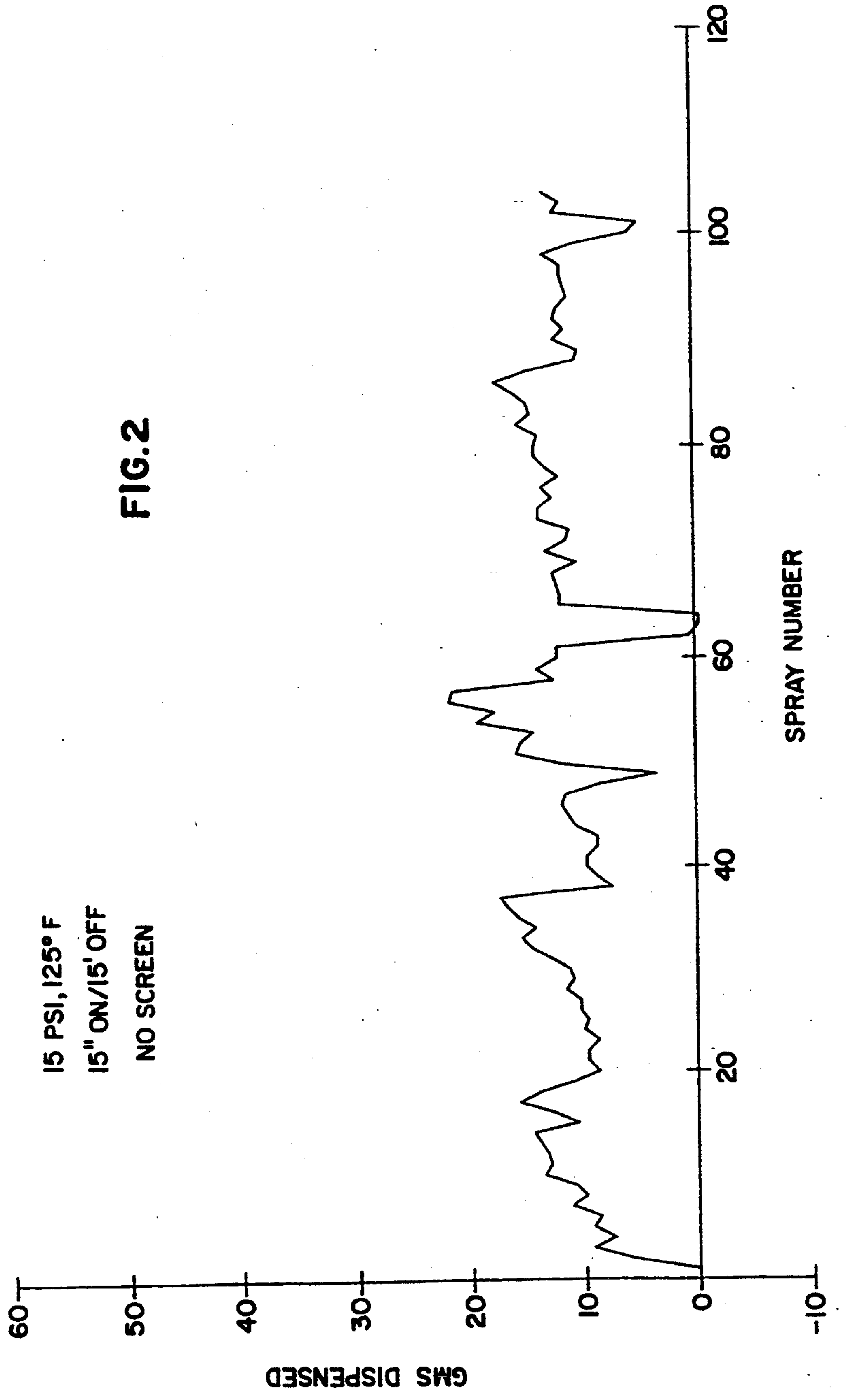
FIG. 2 is a graphical representation of a controlled dispensing of chlorine at a consistent amount of about 5 grams of chlorine per dispensing cycle using the tablets of the invention.

FIG. 2 is a graphical representation showing that dispensing the shaped solids of the invention can achieve a controllable dispensing rate that can range from about 10 to about 20 grams of the shaped solid per spray cycle. No undesirable peaks of large amounts of chlorine bleach is shown dispensed in the Figure.

Figure 3:
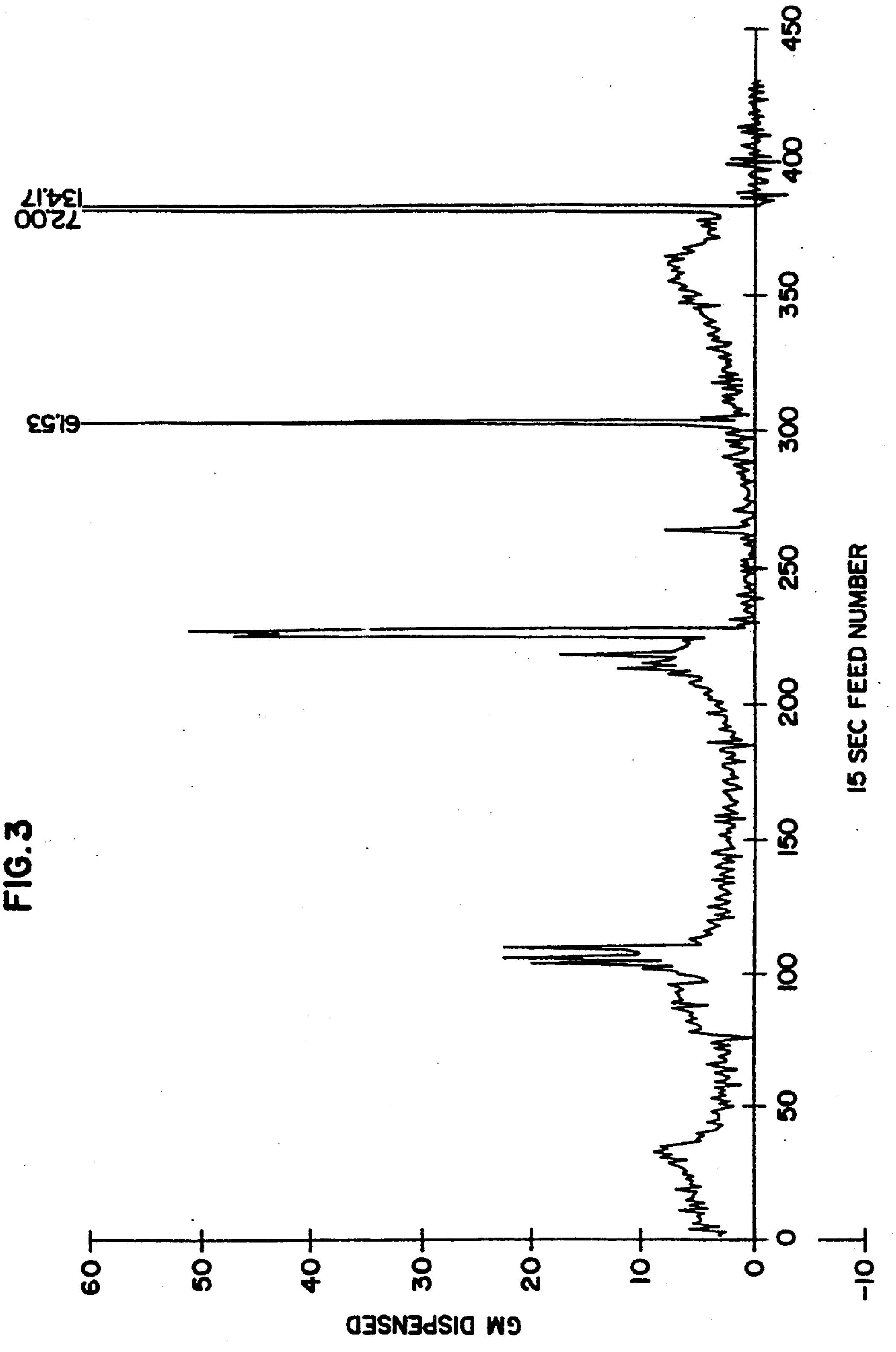
FIG. 3 is a graphical representation of an uncontrolled dispensing of prior art tablets not made in accordance with the invention resulting in spikes of uncontrolled chlorine dispensing substantially greater than 5 grams per cycle.

In sharp contrast, FIG. 3 shows the uncontrolled dispensing of large spikes of high concentrations of chlorine bleach using the prior art compressed tablet comprising chlorinated isocyanurate in the absence of the encapsulate. The Figure shows small spikes of up to 30 grams of chlorine bleach per spray cycle but also shows significant spikes of chlorine bleach reaching levels of about 130 grams per spray cycle. Such peaks or spikes of chlorine bleach can do serious harm to laundry equipment and laundry load.

EXAMPLES AND DATA

A number of examples of the shaped solids that can be used to dispense active halogen concentrates were made. The solids were tested to show that they could dispense controlled even amounts of bleaching concentrate without dispensing harmful excessive amounts of oxidizing bleach. Our experiments were done using commonly available sources of chlorine bleach, however we believe the invention can work with a variety of powdered sources of halogen bleach. We believe that there is a useful interaction between the powdered bleach material and the encapsulate which produces a stable tablet, controlled dispensing, and sufficient hydrophobicity to prevent the dispensing water from destroying the tablet during dispensing. The following examples contain a best mode.

Example 1

A series of shaped solids in the form of a cylinder having a 4 inch diameter and an approximately 1 inch height were made containing about 600 total grams of material. The tablets contained varying proportion of additive materials. The ingredients used to make the tablet were added to a mechanical blender and shaken until uniform. The material was then introduced into a hand tablet compression device. The powder was compressed into a tablet at a pressure of about 11,000 pounds of pressure for a press time of about 30 seconds. The shaped solids produced are shown below in Table I.

TABLE I

| Example | 600-Gram, 4-Inch Solid Table Quantity | Additives Concentration (%) | Number of Additives |
|---|---|---|---|
| 1 | 3 | 1 | 2 (Organic Binder) |
| 2 | 3 | 2 | 1 (Organic Binder) |
| 3 | 3 | 3 | 2 (Organic Binder) |
| 4 | 3 | 1 | 1 (Organic Binder) |
| 1A | 3 | 1 | 2 (Organic Binder) |
| 5 | 3 | 2 | 2 (Organic Binder) |
| 6 | 3 | 1 | 1 (Lauric Acid) |
| 7 | 3 | 2 | 1 (Lauric Acid) |
| 8 | 3 | 100 | 1 ($Cl_2$-Encapsulate) |
| 9 | 3 | 10 | 1 (Lauric Acid) |

TABLE I-continued

| Example | 600-Gram, 4-Inch Solid Table Quantity | Additives Concentration (%) | Number of Additives |
|---|---|---|---|
| 10 | 3 | 10 | 1 (Carbowax ®) |
| 11 | 3 | 30 | 1 ($Cl_2$-Encapsulate) |
| 12 | 3 | 25 | 1 ($Cl_2$-Encapsulate) |
| 13 | 3 | 20 | 1 ($Cl_2$-Encapsulate) |
| 14 | 3 | 15 | 1 ($Cl_2$-Encapsulate) |
| 15 | Capsule filled with calcium hypochlorite mini-tablets (Pittabs) | | |

The active halogen source used was a sodium salt dihydrate of chlorinated isocyanuric acid (CDB-56). The 600 gram, 4 inch solid tablets with various binders and other ingredients were then tested in an automatic dispensing system. Three tablets of each kind were stacked in a plastic disposable bottle or capsule. The capsule containing the tablets was inverted on a load cell which continuously monitored its weight. Water was sprayed upward into the pellet onto the tablet contents at a duty cycle of 15 seconds spray on; 15 minutes spray off for a continuing cycle. Eight pounds per square inch water pressure was used with 125° F. water. Examples 1-5 made using 1-3 wt % of a variety of organic and inorganic binder additives suffer severely from slushing problems leading to uncontrolled dispensing. An example of uncontrolled dispensing is shown in FIG. 3 which is a graphical representation of the dispensing experiment performed on the tablet of Example 3. During dispensing at the 100-105 cycle, at the 200-225 cycle, at the 300-310 cycle and about at the 380 cycle, large uncontrolled excursions of chlorine concentration were dispensed substantially greater than 20 grams per dispensing cycle. The maximum amount of chlorine source dispensed in this test was 134.17 grams of the chlorine source late in the test. The phenomenon of "slushing" is indicated by the unusually large spikes or peaks of uncontrolled chlorine dispensing usually preceded by cycles of extremely small amounts dispensed. In other words, we believe the shaped solids soak water from the spray nozzle, gradually losing its mechanical integrity leading to initial cracks and finally to crumbling which leads to the release of substantial proportions of the mass into the dispenser stream. The phenomenon of "slushing" was also monitored visually as a slow expansion of the tablet height and the development of fissures and cracks. Time video tapes of the tablets during dispensing were also made. These visual observations were used together with the dispensing figures in judging how well the different tablets were being dispensed. The tablets 6 and 7 made using 1-2 wt % lauric acid also suffered severe slushing problems. The tablet shown in Example 10 using 10% of a polyethylene glycol (Carbowax 8000) binder system exhibited excellent dispensing profile, however on thermostability testing, the Carbowax containing materials decolorized and showed substantial thermal instability between the chlorine source and Carbowax. The Examples 11-14 with 15, 20, 25 and 30 wt % of an encapsulated chlorine source, respectively, exhibited excellent dispensing profiles and thermostability. Example 8 made entirely of encapsulated chlorine source displayed excellent dispensing properties. However, the use of all encapsulate is expensive and not commercially attractive. Example 15 using calcium hypochlorite showed excellent dispensing properties but suffered from the drawback that the use of this chlorine source can introduce substantial proportions of hardness (calcium salts) into the washing liquor.

10 gram samples of the formulas shown in Table II were made using a hand driven lab press at 6000 pounds of pressure with a press time of 30 seconds. We conducted a wicking test performed by placing tablets in 5 grams of dyed water (Sudan IV dye) in a watch glass and noted tablet condition at various time intervals. The tablets were monitored for 10 minutes and the tablet appearance was noted. In particular, we looked for swelling, cracking and disintegration, chemical bubbling and exotherm.

rial that permits the manufacture of the shaped solids in an efficient manner resulting in a mechanically stable, useful solid. Further, the encapsulated chlorine source permits the controlled dispensing of halogen bleach into a bleaching/cleaning locus. We have found that a number of the other binders, active cleaning agents, surfactants, etc. can be used in making the tablets of the invention, however, only the encapsulated chlorine source provides all of the characteristics required for a mechanically stable tablet, ease of manufacture, controlled dispensing of chlorine and high active bleaching without chemical incompatibility.

TABLE II

| | | | | | IMMERSION TEST-TUBE MATERIALS SOLID BLEACH TABLETS | | | | | | | |
|---|---|---|---|---|---|---|---|---|---|---|---|---|
| CDB | 56[1] | Encapsulate | MPEG | METASIL/ ANY | METASIL/ PENT | STP/ LT. DEN | ZEOLITE | PAA[2] | BRITESIL | LAS | DRAKEOIL | SLS |
| 1 | 90 | 10 | | | | | | | | | | |
| 3 | 80 | 20 | | | | | | | | | | |
| 5 | 70 | 30 | | | | | | | | | | |
| 7 | 95 | | 5 | | | | | | | | | |
| 9 | 90 | | 10 | | | | | | | | | |
| 11 | 90 | | | 10 | | | | | | | | |
| 13 | 90 | | | | 10 | | | | | | | |
| 15 | 90 | | | | | 10 | | | | | | |
| 29 | 90 | | | | | | 10 | | | | | |
| 37 | 90 | | | | | | | 10 | | | | |
| 39 | 90 | | | | | | | | 10 | | | |
| 41 | 90 | | | | | | | | | 10 | | |
| 66 | 97.5 | | | | | | | | | | 2.5 | |
| 69 | 90 | | | | | | | | | | | 10 |

[1]chlorinated isocyanurate
[2]Polyacrylic acid

Sample No. 1 having 10 wt % of encapsulated halogen source absorbed water and generated cracks in its mass. However, the tablet did not crumble indicating the tablet could withstand distress of dispensing. Tablets 3 and 5 after immersion generated small cracks but were intact after 10 minutes showing that they are adequate for controlled dispensing. Tablets 7 and 9 containing 5–10 wt % of methyl ether of polyethylene glycol casting agent cracked and showed evidence of thermal instability. Tablets 11 and 13 containing anhydrous sodium metasilicate and binder bubbled and exothermed showing the unsuitability of metasilicate as a binder. Tablet 15 containing sodium tripolyphosphate (light density) was very hydrophilic, absorbed substantial quantities of water and crumbled completely indicating its unsuitability for accurate controlled dispensing. Tablet 29 containing sodium zeolite similarly disintegrated completely. Tablet 37 containing 10 wt % of a polyacrylic acid composition failed to form an adequate solid tablet upon compression. Tablet 39 containing 10 wt % of britesil silicate absorbed water, cracked and swelled causing some degree of disintegration indicating its unsuitability for controlled dispensing. Tablet 41 containing linear alkyl sulfonate cracked and retained substantial quantities of water on dispensing. Tablet 66 containing 2.5 wt % DRAKEOIL did not absorb water initially but did absorb some small part of water, but was hydrophobic and failed to dispense adequate amounts of halogen source. Tablet 69 cracked and retained water indicating its general unsuitability for dispensing controlled amounts of chlorine.

From this data and other experiments we have conducted with the shaped solids containing the encapsulate source of halogen used in this invention shows that the use of the encapsulated halogen source provides two important qualities to the shaped solids of the invention. First, the halogen source acts as a binder mate- The above specification, examples and data provide for a basic understanding of the invention. However, since many embodiments of the invention can be made without departing from the spirit and scope of the invention, the invention resides in the claims hereinafter appended.

We claim:

1. A shaped solid halogen bleach composition comprising a continuous solid phase of an active halogen bleach source and about 10 to 80 wt %, based on the solid, of an encapsulate active halogen bleach source, said encapsulate comprising an active halogen source and at least one encapsulating layer.

2. The solid of claim 1 wherein the shaped solid is a cylindrical solid with a thickness of about 10 to 80 millimeters and a diameter of about 20 to 150 millimeters, wherein the encapsulate is evenly dispersed throughout the solid phase.

3. The solid of claim 2 wherein the source of active halogen of the continuous phase or the halogen source of the encapsulate comprises a chlorinated isocyanuric acid compound.

4. The solid of claim 1 wherein the mass of the solid is at least 1 gram and the encapsulate has a diameter no greater than about 5 millimeters.

5. The solid of claim 1 wherein the active halogen bleach comprises a source of active chlorine.

6. The solid of claim 5 wherein the source of active chlorine comprises chlorinated trisodium phosphate, chlorinated sodium tripolyphosphate, or mixtures thereof.

7. The solid of claim 1 wherein the encapsulate comprises a core of an active halogen source and at least one organic encapsulating layer.

8. The solid of claim 1 wherein the encapsulate comprises a core comprising an active halogen source and at least one inorganic encapsulating layer.

9. The solid of claim 1 wherein the encapsulate comprises a core of an active halogen source, a first inorganic inner layer and a second organic outer layer.

10. The solid of claim 1 wherein the continuous solid phase also contains a binder (tableting aid).

11. The solid of claim 1 wherein the solid comprises a compressed solid.

12. The solid of claim 1 wherein the particle size of the continuous phase is about 0.2 to 5 millimeters.

13. The solid of claim 1 wherein the solid further comprises a wetting agent.

14. The solid of claim 1 wherein the solid further comprises a sequestrant.

15. A solid tablet chlorine bleach composition comprising a continuous solid phase of an active chlorine source and about 10 to 80 wt % based on the solid of an encapsulated chlorinated isocyanuric acid, said encapsulate comprising an active core of chlorinated isocyanuric acid and at least one encapsulating layer.

16. The solid of claim 15 wherein the chlorine source of the continuous solid phase also comprises chlorinated isocyanuric acid.

17. The solid of claim 15 wherein the solid phase comprises chlorinated trisodium phosphate, chlorinated trisodium polyphosphate, calcium hypochlorite or mixtures thereof.

18. The solid of claim 15 wherein the thickness of the solid is about 20 to 80 millimeters having a diameter of about 50 to 150 millimeters and the encapsulated chlorinated isocyanurate is evenly dispersed throughout the solid phase.

19. The solid of claim 18 having a mass of at least 1 gram and a particulate having a diameter of no greater than about 5 millimeters.

20. The solid of claim 18 wherein the encapsulate has at least one inorganic layer.

21. The solid of claim 18 wherein the encapsulate has at least one organic layer.

22. The solid of claim 18 wherein the encapsulate comprises a core of chlorinated isocyanuric acid, a first inner inorganic layer and an external organic layer.

23. The solid of claim 18 wherein the solid phase further contains a diluent.

24. The solid of claim 18 wherein the continuous phase further contains a binder (tableting aid).

25. The solid of claim 18 wherein the continuous phase further comprises a wetting agent.

26. The solid of claim 18 wherein the continuous phase further comprises a sequestrant.

27. A method of washing laundry with an aqueous bleach, said method comprising contacting a wash load with an aqueous bleach solution made by contacting the bleach solid of claim 1 with an aqueous spray.

28. A method of washing laundry with an aqueous bleach, said method comprising contacting a wash load with an aqueous bleach solution made by contacting the bleach solid of claim 18 with an aqueous spray.

* * * * *

UNITED STATES PATENT AND TRADEMARK OFFICE
CERTIFICATE OF CORRECTION

PATENT NO. : 5,407,598

DATED : April 18, 1995

INVENTOR(S) : Olson et al.

It is certified that error appears in the above-identified patent and that said Letters Patent is hereby corrected as shown below:

On column 6, line 7, please delete "coating" and substitute therefore --coatings--

On column 11, line 31, claim 18, please add --, the solid-- after the word "millimeters"

Signed and Sealed this

First Day of August, 1995

Attest:

Bruce Lehman

BRUCE LEHMAN

*Attesting Officer* *Commissioner of Patents and Trademarks*